United States Patent
Nolting et al.

(10) Patent No.: US 12,388,389 B2
(45) Date of Patent: Aug. 12, 2025

(54) METHOD AND SYSTEM FOR CONTROLLING A DYNAMOELECTRIC MACHINE

(71) Applicant: Siemens Aktiengesellschaft, Munich (DE)

(72) Inventors: Christoph Nolting, Höchstadt/Aisch (DE); Markus Schwaben, Hohenroth-Leutershausen (DE); Jürgen Böhling, Dachau (DE); Dirk Scheibner, Nuremberg (DE); Jürgen Zettner, Veitsbronn (DE); Juergen Mueller, Poppenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 116 days.

(21) Appl. No.: 18/035,436

(22) PCT Filed: Sep. 17, 2021

(86) PCT No.: PCT/EP2021/075661
§ 371 (c)(1),
(2) Date: May 4, 2023

(87) PCT Pub. No.: WO2022/096186
PCT Pub. Date: May 12, 2022

(65) Prior Publication Data
US 2024/0014764 A1 Jan. 11, 2024

(30) Foreign Application Priority Data
Nov. 5, 2020 (EP) .................................. 20205978

(51) Int. Cl.
*H02P 29/60* (2016.01)
*H02P 29/032* (2016.01)

(52) U.S. Cl.
CPC ............ *H02P 29/60* (2016.02); *H02P 29/032* (2016.02)

(58) Field of Classification Search
CPC ............................... H02P 29/60; H02P 29/032
See application file for complete search history.

(56) References Cited

U.S. PATENT DOCUMENTS

| | | | |
|---|---|---|---|
| 9,441,868 B1* | 9/2016 | Barot ................. | B60H 1/00378 |
| 2016/0230648 A1* | 8/2016 | Sanchez Perez ....... | F02B 37/14 |

(Continued)

FOREIGN PATENT DOCUMENTS

| | | |
|---|---|---|
| DE | 198 12 345 A1 | 9/1999 |
| DE | 100 15 747 A1 | 10/2001 |
| DE | 10 2017 120 662 A1 | 3/2019 |

OTHER PUBLICATIONS

PCT International Search Report and Written Opinion of International Searching Authority mailed Jan. 4, 2022 corresponding to PCT International Application No. PCT/EP2021/075661 filed Sep. 17, 2021.

*Primary Examiner* — Zoheb S Imtiaz
(74) *Attorney, Agent, or Firm* — Henry M. Feiereisen LLC

(57) ABSTRACT

In a method for controlling a dynamoelectric machine, in particular a dynamoelectric rotary machine, an ambient air pressure of the dynamoelectric machine is ascertained by determining an altitude and/or by measuring the ambient air pressure, and a power output of the dynamoelectric machine is adapted as a function of the ambient air pressure to counteract an air pressure which drops as installation altitude rises and an associated deterioration of cooling properties, and to ensure a sufficient cooling of the machine.

19 Claims, 3 Drawing Sheets

(56) References Cited

U.S. PATENT DOCUMENTS

| | | | |
|---|---|---|---|
| 2016/0258368 A1* | 9/2016 | Ge | F02D 41/1452 |
| 2019/0170418 A1* | 6/2019 | Barot | B60H 1/32014 |
| 2021/0239559 A1* | 8/2021 | Unruh | H04R 19/04 |
| 2023/0335765 A1* | 10/2023 | Rahm | H01M 8/04111 |

* cited by examiner

METHOD AND SYSTEM FOR CONTROLLING A DYNAMOELECTRIC MACHINE

CROSS-REFERENCES TO RELATED APPLICATIONS

This application is the U.S. National Stage of International Application No. PCT/EP2021/075661, filed Sep. 17, 2021, which designated the United States and has been published as International Publication No. WO 2022/096186 A1 and which claims the priority of European Patent Application, Serial No. 20205978.8, filed Nov. 5, 2020, pursuant to 35 U.S.C. 119(a)-(d).

BACKGROUND OF THE INVENTION

The invention relates to a method and a system for controlling a dynamoelectric machine.

Electric drives, mostly having a converter and a dynamoelectric machine, are designed predominantly for maximum installation altitudes of 2000 m MSL. If the installation of the drive at higher altitudes is planned, a derating of a power output of the drive is often carried out. However, the installation altitude must be known during project planning.

There is a risk, however, that the installation altitude will not be specified correctly or will be changed subsequently.

However, this can have a disadvantageous effect on the cooling of the drive, in particular of the machine, and thus lead to a failure.

The object of the invention is therefore to improve this.

SUMMARY OF THE INVENTION

The object is achieved by a method for controlling a dynamoelectric machine, in particular a dynamoelectric rotary machine, comprising the following steps:
ascertaining an ambient air pressure of the dynamoelectric machine by means of an apparatus for determining air pressure,
adapting a power output of the dynamoelectric machine as a function of the ambient air pressure.

The adaptation of the power output is advantageously achieved by means of a load curve and/or by means of a characteristic curve and/or by means of a table. Other forms which relate the power output to the ambient air pressure are also possible.

The invention is particularly suitable for dynamoelectric machines. However, the invention can also be applied to transformers.

The Invention is particularly suitable for dynamoelectric rotary machines, but use in linear drives is also conceivable.

A current ambient air pressure is preferably ascertained here.

A torque and/or a rotational speed of the machine are preferably adapted.

An embodiment according to which the ambient air pressure is determined by ascertaining an altitude is advantageous.

In addition, an embodiment according to which the altitude is determined by means of an altimeter or by means of a global navigation satellite system is advantageous.

In this connection, the altimeter is preferably a barometric altimeter. Furthermore, the altitude can also be determined otherwise.

Global navigation satellite systems are, for example, NAVSTAR GPS from the United States of America, GLO-NASS from the Russian Federation, Galileo from the European Union and Beidou from the People's Republic of China. Others are also conceivable.

In this case, the global navigation satellite system advantageously provides information regarding a position on the globe and/or information regarding an altitude above sea level for determining the altitude.

In addition, an embodiment according to which the ambient air pressure is measured, in particular by means of a barometer, is advantageous.

A barometer is a measuring device for determining a static absolute air pressure.

In addition, an embodiment according to which an ambient air flow is ascertained is advantageous.

This is achieved, for example, by means of a flow sensor. This can measure an air flow, in particular in ducts and in positions which are difficult to access. Changing directions of flow or directed flows can be detected.

A thermal anemometer sensor is sometimes suitable. Others are also conceivable.

The ambient air flow can also be measured with an impeller sensor. Impeller sensors can measure the air flow, in particular at outlets or also in ducts.

In addition, an embodiment according to which an ambient air humidity is ascertained is advantageous.

This is advantageously achieved by means of a moisture meter. This is advantageously suitable for measuring a moisture content in the air or solids.

The ambient air humidity is preferably ascertained using a hygrometer.

In addition, an embodiment according to which an ambient temperature is ascertained is advantageous. A temperature sensor, for example, is suitable for this purpose.

For the operation of the machine, it is advantageous to know the exact ambient conditions. These include the ambient conditions mentioned, such as ambient air pressure, ambient air humidity and ambient air flow. Furthermore, there is also knowledge of the presence of certain gases, in particular harmful gases.

A lower ambient air pressure—compared to standard conditions—reduces the cooling of the machine, which can lead to overheating. The ambient air flow can also have an influence on the cooling.

A high ambient air humidity, including with the risk of condensation, can impair the function of an, for example, optical, transmitter. This can lead to the provision of information regarding rotational speed, commutation and/or position not being reliable.

Furthermore, harmful gases can limit the service life of insulating materials or permanent magnets.

A further temperature sensor can also be arranged in the machine, in particular in a winding of the machine.

In addition, an embodiment is advantageous, according to which the power output of the dynamoelectric machine is adapted as a function of the ambient air pressure and/or of the ambient air flow and/or of the ambient air humidity and/or of the ambient temperature.

This is advantageously achieved in that the power output of the dynamoelectric machine is related to the ambient air pressure and/or to the ambient air flow and/or to the ambient air humidity and/or to the ambient temperature by means of the load curve or characteristic curve or table.

In addition, an embodiment is advantageous, according to which a power output of the dynamoelectric machine is reduced as a function of the ambient air pressure and/or the ambient air flow and/or the ambient air humidity and/or the ambient temperature.

The invention offers the advantage that knowledge regarding the installation altitude is obtained. As the air pressure and the air density decrease with increasing altitude, a deterioration of cooling properties and thus an overheating of the machine is to be expected. The invention can react to this, whereby damage to the machine and/or failure of the machine can be avoided.

The invention also offers the advantage that weather-related pressure fluctuations can be taken into account.

Furthermore, with increasing altitude, cosmic radiation increases, which is particularly significant for the operation of power semiconductors. Cosmic radiation depends not only on the altitude above sea level but also on the geographical latitude. In addition, the risk of partial discharges increases at higher altitudes.

These effects can be taken into account by the invention as the power output of the machine can be adapted as required.

The above object is further achieved by a system for controlling a dynamoelectric machine, in particular a dynamoelectric rotary machine, in particular for carrying out such a method, having:
- a dynamoelectric machine, in particular a dynamoelectric rotary machine,
- an apparatus for determining air pressure,
- a function for adapting a power output of the dynamoelectric machine.

An embodiment according to which the system has an altimeter is advantageous.

The altitude is preferably measured barometrically, by means of sound, laser and/or microwave.

In addition, an embodiment according to which the system has a receiver for receiving information from a global navigation satellite system is advantageous.

In this way, information with regard to a position on the globe and/or with regard to an altitude above sea level can be reliably obtained. Others are also conceivable.

In addition, an embodiment according to which the system has a measuring apparatus for measuring the ambient air pressure is advantageous.

A barometer is particular suitable for this purpose.

In addition, an embodiment according to which the system has a measuring apparatus for measuring an ambient air flow is advantageous.

Advantageous measuring apparatuses have already been described above.

In addition, an embodiment according to which the system has a measuring apparatus for measuring an ambient air humidity is advantageous.

This is, for example, a hygrometer.

In addition, an embodiment according to which the system has a measuring apparatus for measuring an ambient temperature is advantageous.

In addition, an embodiment is advantageous, according to which the measuring apparatus for measuring an ambient air pressure and/or the measuring apparatus for measuring an ambient air flow and/or the measuring apparatus for measuring an ambient air humidity and/or the measuring apparatus for measuring an ambient temperature has at least one MEMS component.

MEMS (microelectromechanical systems) are small components or modules which combine logic elements and micromechanical structures in a chip, in particular a semiconductor chip. They can process mechanical and/or electrical information. MEMS advantageously contain silicon. However, other materials customary in semiconductor technology are also conceivable.

Structures of the MEMS can be smaller than one micrometer. Thanks to miniaturization, they can be manufactured cheaply and in bulk like semiconductors.

MEMS are also robust and reliable. In addition, a small size, a low price and a low energy requirement are advantageous.

It is also conceivable that NEMS (nanoelectromechanical system) are used instead of or in addition to MEMS.

Instructions are included in the project design instructions of the motor for the ambient conditions listed above. Thus, for example, there is information for a power derating as a function of the installation altitude of the motor.

The invention is advantageous as an atmospheric pressure decreases with increasing altitude above sea level according to the barometric formula. Whether the installation altitude specified during project planning is actually maintained does not need to be monitored.

In addition, weather-related pressure fluctuations can also be taken into account.

Thus, the machine can be better utilized.

BRIEF DESCRIPTION OF THE DRAWING

The invention is described and explained in more detail hereinafter with reference to the exemplary embodiments shown in the figures, in which.

DETAILED DESCRIPTION OF PREFERRED EMBODIMENTS

Figure 1:
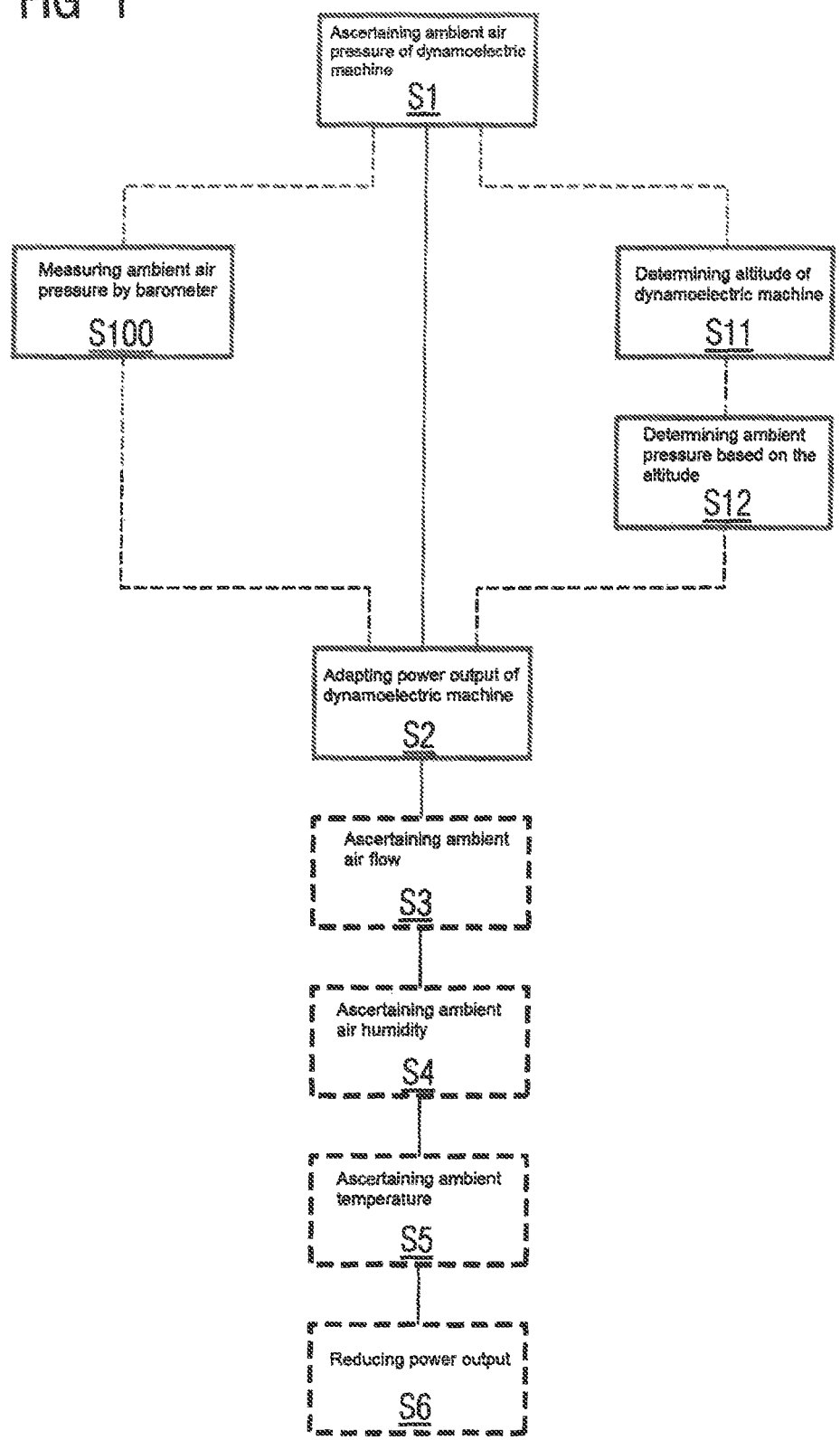
FIG. 1 shows an exemplary sequence of the method according to the invention for controlling a dynamoelectric machine, in particular a dynamoelectric rotary machine.

FIG. 1 shows an exemplary sequence of the method according to the invention for controlling a dynamoelectric machine, in particular a dynamoelectric rotary machine.

The dynamoelectric machine 3 is advantageously a motor or a generator.

In a method step S1, an ambient air pressure of the dynamoelectric machine is ascertained by means of an apparatus for determining air pressure. Advantageously, the current ambient air pressure present at an installation location of the dynamoelectric machine is ascertained.

In a method step S2, a power output of the dynamoelectric machine is adapted, for example on the basis of a load curve (see FIG. 4), in particular to existing ambient conditions.

Instead of the load curve, a characteristic curve, table, etc. can also be used.

In addition to the ambient air pressure already explained, the ambient conditions are advantageously an ambient air flow and/or an ambient air humidity and/or an ambient temperature.

Furthermore, gases, in particular harmful gases, can also be detected.

The ambient air pressure is ascertained, for example, by the method steps S11 and S12, according to which, in method step S11, an altitude of the dynamoelectric machine is determined by means of an altimeter or by means of a global navigation satellite system. In method step S12, the ambient air pressure is determined on the basis of the altitude.

An air pressure at an altitude is essentially constant across the globe. When ascertaining the altitude by means of a global navigation satellite system, a location is advantageously ascertained and the installation location and the altitude are deduced therefrom.

The ambient air pressure can also be ascertained, for example, by a method step S100, according to which the ambient air pressure is measured, in particular by means of a barometer.

In a method step S3, an ambient air flow is ascertained.

In a method step S4, an ambient air humidity is ascertained.

In a method step S5, an ambient temperature is ascertained.

In a method step S6, the power output of the dynamoelectric machine is reduced on the basis of the load curve.

By means of the exemplary load curve or other forms, the power output of the dynamoelectric machine is related to the ambient air pressure and/or to the ambient air flow and/or to the ambient air humidity and/or to the ambient temperature.

Furthermore, a detection of gases is possible. These are preferably alkaline gases and/or acid gases such as, for example, ammonia, acid mist and sulfuric acid.

Acid rain can also be detected.

An output of a warning is conceivable here.

Determination of the variables mentioned is advantageous as they can lead to damage to the system.

Figure 2:
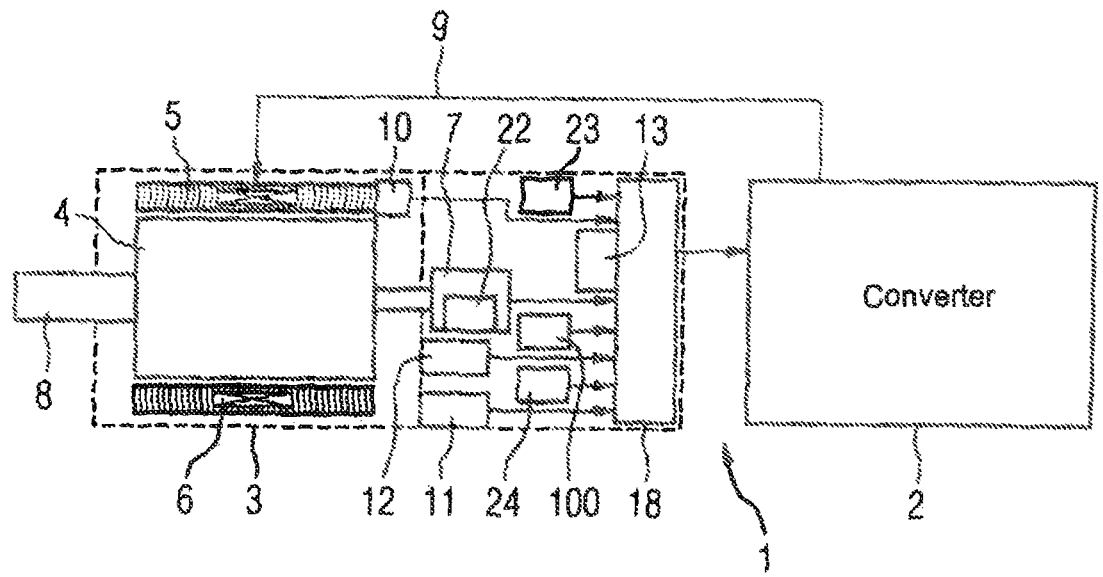
FIG. 2 shows a possible embodiment of the system according to the invention.

FIG. 2 shows a possible embodiment of the system according to the invention 1.

FIG. 2 shows a converter 2 and a dynamoelectric rotary machine 3. This embodiment is preferable, but the invention is also suitable for linear drives or transformers.

The converter 2 advantageously has a control unit or is connected to a control unit.

A function for adapting the power output of the dynamoelectric machine 3, for example on the basis of the load curve, is advantageously present in the converter 2 or the control unit.

Advantageously, the function comprises control and/or regulation algorithms which enable an adaptation, in particular a derating.

The machine 3 depicted has a rotor 4 and a stator 5. The stator has a winding system 6.

The system 1 has a position sensor 7 which is arranged on a shaft 8. The position sensor 7 is, for example, an encoder, or is integrated in an encoder. The encoder is advantageously a rotary encoder or an angle encoder.

The position sensor advantageously has a MEMS component 12.

FIG. 2 shows that the machine 3, in particular the winding system 6, is supplied with electrical energy by the converter 2 (shown by arrow 9).

FIG. 2 shows an altimeter 100.

A temperature sensor 10 is arranged on the stator 5. This is advantageously designed to detect a temperature of the winding system 6.

FIG. 2 shows a measuring apparatus for measuring the ambient air pressure 11. The measuring apparatus 11 advantageously has a MEMS component.

FIG. 2 shows a measuring apparatus for measuring the ambient air humidity 13. The measuring apparatus 13 advantageously has a MEMS component.

FIG. 2 shows a measuring apparatus for measuring the ambient air flow 22. The measuring apparatus 22 advantageously has a MEMS component.

FIG. 2 shows a measuring apparatus for measuring the ambient temperature 23. The measuring apparatus 23 advantageously has a MEMS component.

FIG. 2 shows a measuring apparatus for measuring gases 24. The measuring apparatus 24 advantageously has a MEMS component.

The measuring apparatuses described are designed, for example, as sensors. They can be arranged on a printed circuit board 18, in particular designed as a printed circuit board (PCB for short). Furthermore, they can also be arranged at a distance from the printed circuit board 18. Advantageously, however, they are designed for transmitting information to the printed circuit board 18.

The printed circuit board 18 serves as an interface and is advantageously designed to forward information to the converter 2 or the control unit.

It is also possible to combine the measuring apparatuses or sensors described in one combination sensor.

FIG. 2 shows by way of example a plurality of sensors and measuring apparatuses. Not all the sensors and measuring apparatuses mentioned are required for carrying out the method according to the invention.

Figure 3:
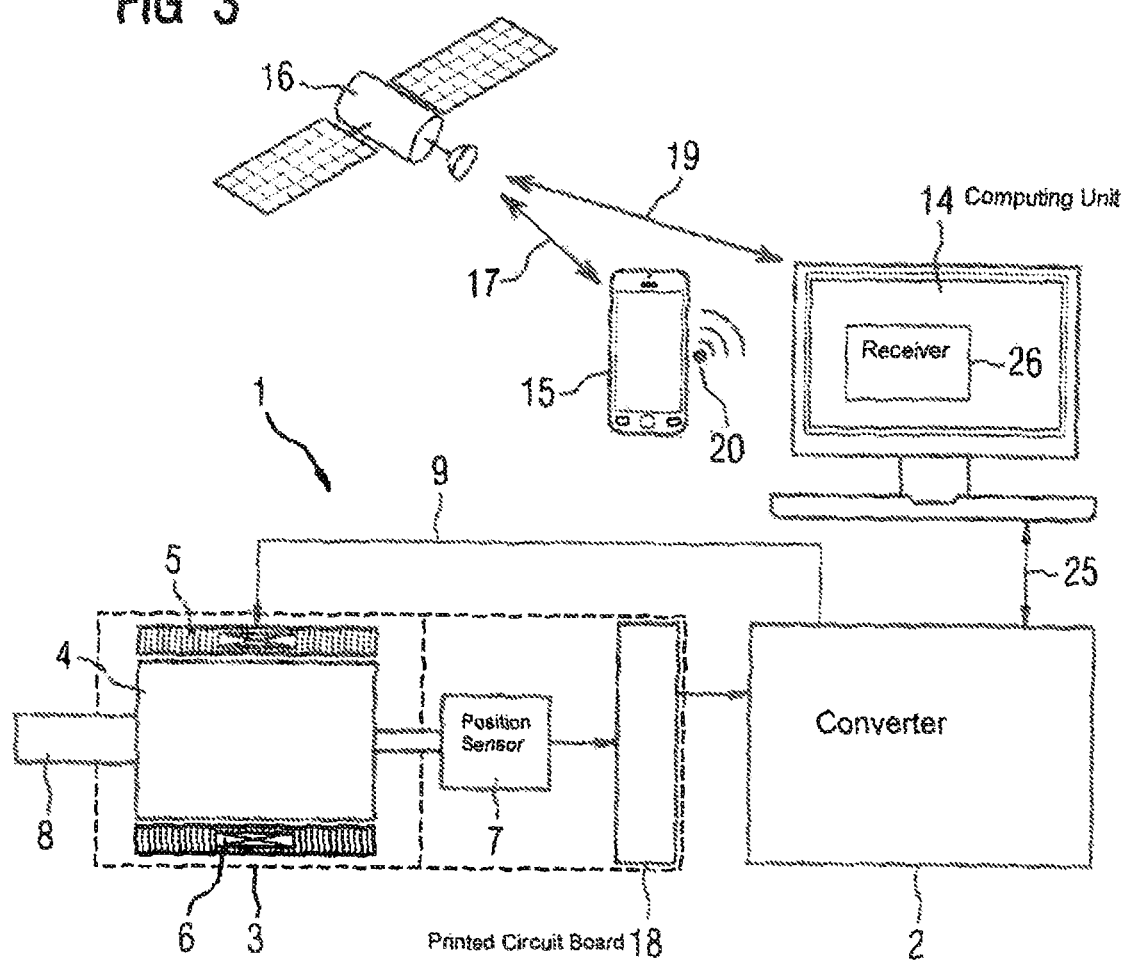
FIG. 3 shows another possible embodiment of the system according to the invention.

FIG. 3 shows a further possible embodiment of the system according to the invention 1.

FIG. 3 essentially shows the system 1 described in FIG. 2.

The system 1 is designed to exchange data (shown by arrow 25) with an external computing unit 14. The computing unit can also be integrated in the converter 2.

The computing unit has a receiver 26 for receiving (shown by arrow 19) Information from a global navigation satellite system 16. In this way, information with regard to a position on the globe and/or with regard to an altitude above sea level can be reliably obtained.

Alternatively or additionally, a smartphone 15 can also obtain the information with regard to the position on the globe and/or with regard to the altitude above sea level (shown by arrow 17).

This is advantageously achieved by means of an app. In this case, the smartphone 15 does not have to remain permanently in the vicinity of the system 1. A reference to the information with regard to the position on the globe and/or with regard to the altitude above sea level is advantageously required when commissioning the system 1.

This information can then be transmitted to the computing unit 14. This is achieved, for example, by means of a wireless or cordless connection 20.

The sensors and measuring apparatuses described in FIG. 2 can also be present in the system 1 shown in FIG. 3.

The apparatus for determining air pressure can thus be, on the one hand, a measuring apparatus which directly determines the ambient air pressure, for example a barometer. However, the apparatus for determining air pressure can also be a device which determines the altitude, in particular by means of satellite information, and therefrom—indirectly as it were—determines the ambient air pressure.

Figure 4:
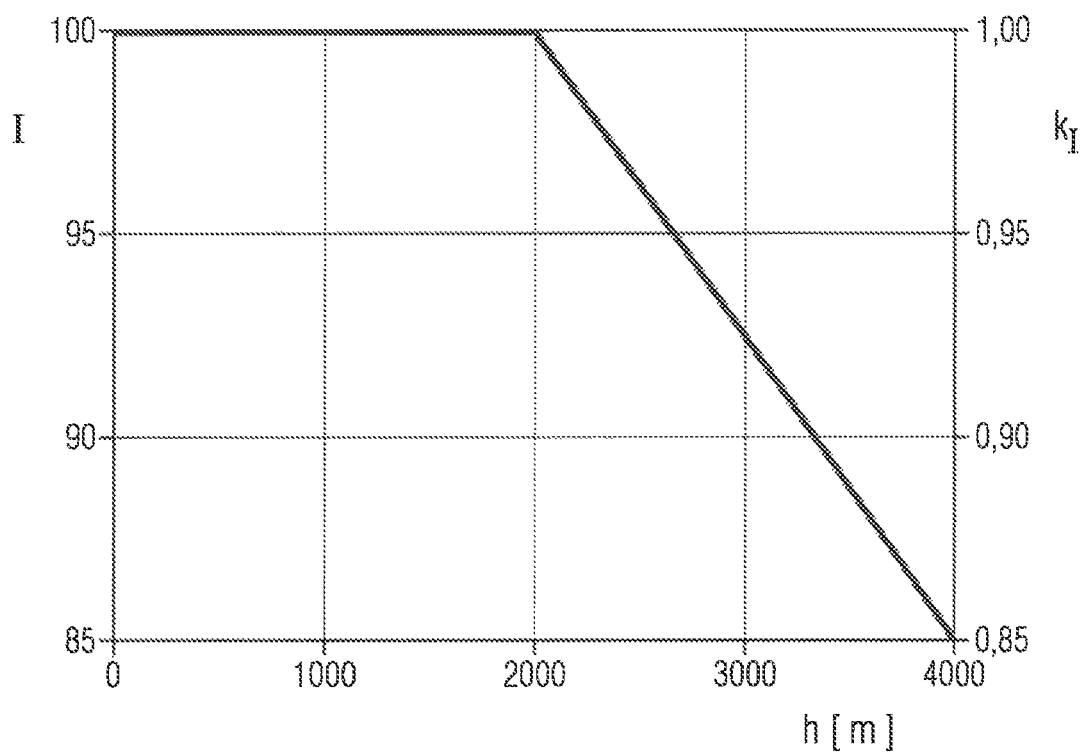
FIG. 4 shows an exemplary load curve.

FIG. 4 shows an exemplary load curve.

The x-axis shows an installation altitude h in meters m of the dynamoelectric machine above sea level.

On the y-axis, a permissible continuous current in % of the nominal current is shown as well as a derating factor $k_i$, which provides information about a reduction in the power output of the dynamoelectric machine.

The load curve shows that the permissible continuous current is reduced from an installation altitude of 2000 m MSL, in particular in order to ensure sufficient cooling of the machine and thus avoid damage to the machine.

The invention is advantageous, for example, for lifts and other transport apparatuses, pumps, in particular pumps in the mountains, trains and other electric vehicles which travel at high altitudes. The invention is also advantageous for mining and industrial motors. Other fields of application are also conceivable.

What is claimed is:

1. A method for controlling a dynamoelectric rotary machine, said method comprising:
ascertaining an ambient air pressure of the dynamoelectric rotary machine by determining an altitude and/or by measuring the ambient air pressure, wherein the dynamoelectric rotary machine comprises a stator and a rotor; and adapting, with a control unit of the dynamoelectric rotary machine, a power output of the dynamoelectric rotary machine as a function of the ambient air pressure by reducing a permissible continous current of the dynamoelectric rotary machine based on a load curve with a derating factor to counteract an air pressure which drops as installation altitude of the dynamoelectric rotary machine rises and an associated deterioration of cooling properties, and to ensure a sufficient cooling of the dynamoelectric rotary machine.

2. The method of claim 1, wherein the ambient air pressure is measured by a barometer.

3. The method of claim 1, wherein the altitude is determined by an altimeter or by a global navigation satellite system.

4. The method of claim 1, further comprising ascertaining an ambient air flow to influence cooling of the dynamoelectric rotary machine.

5. The method of claim 1, further comprising ascertaining an ambient air humidity to identify impairment of an encoder due to high ambient air humidity.

6. The method of claim 1, further comprising ascertaining an ambient temperature.

7. The method of claim 1, wherein the power output of the dynamoelectric rotary machine is further adapted as a function of an ambient air flow and/or an ambient air humidity and/or an ambient temperature.

8. The method of claim 1, further comprising reducing a power output of the dynamoelectric rotary machine as a function of an ambient air flow and/or an ambient air humidity and/or an ambient temperature.

9. A system, comprising: a dynamoelectric rotary machine comprising a stator and a rotor; an apparatus configured to determine ambient air pressure as a function of an altitude; and a control unit configured to adapt a power output of the dynamoelectric rotary machine as a function of the ambient air pressure by reducing a permissible continuous current of the dynamoelectric rotary machine based on a load curve with a derating factor to counteract an air pressure which drops as installation altitude of the dynamoelectric rotary machine rises and an associated deterioration of cooling properties, and to ensure a sufficient cooling of the dynamoelectric rotary machine.

10. The system of claim 9, further comprising an altimeter to determine the altitude.

11. The system of claim 9, further comprising a receiver configured to receive information from a global navigation satellite system.

12. The system of claim 9, further comprising a measuring apparatus configured to measure the ambient air pressure.

13. The system of claim 12, wherein the measuring apparatus includes a MEMS component.

14. The system of claim 9, further comprising a measuring apparatus configured to measure an ambient air flow to influence cooling of the dynamoelectric rotary machine.

15. The system of claim 14, wherein the measuring apparatus includes a MEMS component.

16. The system of claim 9, further comprising a measuring apparatus configured to measure an ambient air humidity in order to identify impairment of an encoder due to a high ambient air humidity.

17. The system of claim 16, wherein the measuring apparatus includes a MEMS component.

18. The system of claim 9, further comprising a measuring apparatus configured to measure an ambient temperature.

19. The system of claim 18, wherein the measuring apparatus includes a MEMS component.

* * * * *

UNITED STATES PATENT AND TRADEMARK OFFICE
CERTIFICATE OF CORRECTION

| | | |
|---|---|---|
| PATENT NO. | : 12,388,389 B2 | Page 1 of 1 |
| APPLICATION NO. | : 18/035436 | |
| DATED | : August 12, 2025 | |
| INVENTOR(S) | : Christoph Nolting et al. | |

It is certified that error appears in the above-identified patent and that said Letters Patent is hereby corrected as shown below:

On the Title Page

Item (56), under Foreign Patent Documents:
Replace "DE 10 2017 120 662 A1" with the correct -- DE 10 2017 120 652 A1 --.

Signed and Sealed this
Twenty-third Day of September, 2025

John A. Squires
*Director of the United States Patent and Trademark Office*